A. GUEVARA.
PNEUMATIC TIRE.
APPLICATION FILED JUNE 26, 1918.

1,285,684.

Patented Nov. 26, 1918.

Inventor
Augustin Guevara,
By Jas. F. Richmond
Attorney

UNITED STATES PATENT OFFICE.

AGUSTIN GUEVARA, OF PUEBLA, MEXICO.

PNEUMATIC TIRE.

1,285,684.

Specification of Letters Patent.

Patented Nov. 26, 1918.

Application filed June 26, 1918. Serial No. 241,943.

*To all whom it may concern:*

Be it known that I, AGUSTIN GUEVARA, a citizen of Mexico, residing at Puebla, Mexico, have invented certain new and useful Improvements in Pneumatic Tires, of which the following is a specification.

This invention relates to pneumatic tires and more especially to the inner tubes thereof.

One of the principal objects is to provide an inner tube of greater strength and durability than any now in use.

Another object is to provide an inner tube that will hold up despite damage to the carcass or casing.

Another object is to provide an inner tube so protected or reinforced that in the event of the collapse or rupture of the tire, the structure as a whole will operate indefinitely as a cushion tire without irreparable damage to the carcass or casing.

With the foregoing and other objects in view, the nature, characteristic features and scope of the invention will more readily be understood from the following description taken in connection with the accompanying drawing, forming a part hereof, wherein—

Figure 1:
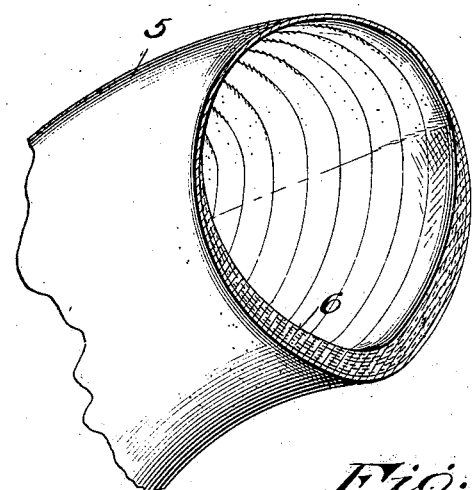
Figure 1 is a perspective view of a section of an inner tube constructed in accordance with my invention.
Figure 2:
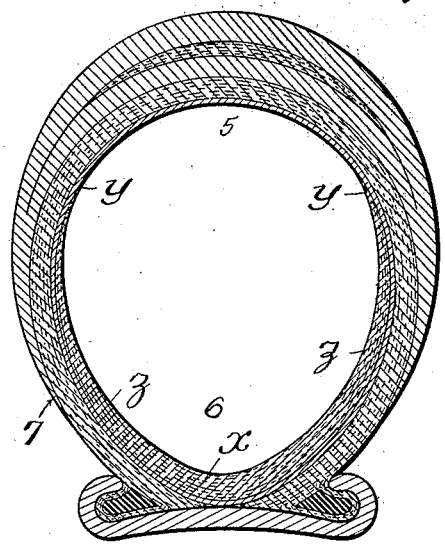
Fig. 2 is a transverse sectional view of the invention applied to a tire.

In practising the invention, I provide the usual rubber inner tube 5 with an internal sheath, reinforce or lining 6 of generally crescent form in cross-section with the horns extending toward the tread. That is to say, the reinforce is comparatively thick at the bottom or rim side of the tube and gradually diminishes in thickness until it merges with the inner tube at points well nigh the tread side. I prefer to use for this purpose layers or laminæ of canvas or duck and rubber, the same existing in two or more plies at $x$ and gradually diminishing upwardly until the structure terminates in a single layer $y$ at a point beyond a line bisecting the tire. This provides an adequate defense at $z$ for the comparatively unprotected adjoining side portion of the casing 7.

Evidently then, I provide an inner tube that is practically unbreakable. That is to say, the sheath or lining 6 protects it at the bottom and sides from injury resulting from pinching, &c., and on the tread side it is protected by the usual casing defense.

Having described the nature and objects of the invention, I claim:—

1. An inner tube having internally thereof a protective sheath of generally crescent form in cross-section with the horns directed toward the tread, substantially as and for the purpose set forth.

2. The combination with a tire casing, of an inner tube having internally thereof a protective fabric sheath of generally crescent form with the horns extending in the region of the tread.

3. The combination with a tire casing, of an inner tube having internally thereof a protective sheath of generally crescent form in cross-section with the horns directed toward the tread, said sheath consisting of varying thicknesses of canvas, substantially as described.

In testimony whereof I affix my signature.

AGUSTIN GUEVARA.